United States Patent
Narasimha et al.

(10) Patent No.: US 9,805,289 B2
(45) Date of Patent: Oct. 31, 2017

(54) COLOR-BASED POST-PROCESSING OF IMAGES

(71) Applicants: Ramya Narasimha, Palo Alto, CA (US); Jorge Moraleda, Menlo Park, CA (US); Kathrin Berkner, Los Altos, CA (US); Srikrishna Bhat, Karnataka (IN); Sri Kaushik Pavani, Chennai (IN); Anshul Garg, Pin (IN)

(72) Inventors: Ramya Narasimha, Palo Alto, CA (US); Jorge Moraleda, Menlo Park, CA (US); Kathrin Berkner, Los Altos, CA (US); Srikrishna Bhat, Karnataka (IN); Sri Kaushik Pavani, Chennai (IN); Anshul Garg, Pin (IN)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 14/975,639

(22) Filed: Dec. 18, 2015

(65) Prior Publication Data
US 2017/0177978 A1    Jun. 22, 2017

(51) Int. Cl.
*G06K 9/00*    (2006.01)
*G06K 9/62*    (2006.01)
(Continued)

(52) U.S. Cl.
CPC ......... *G06K 9/6217* (2013.01); *G06K 9/4642* (2013.01); *G06K 9/4652* (2013.01);
(Continued)

(58) Field of Classification Search
CPC .. G06K 9/6202; G06K 9/4671; G06K 9/6201; G06K 9/6255; G06K 9/6267;
(Continued)

(56) References Cited

U.S. PATENT DOCUMENTS 7,953,299 B2    5/2011   Shiiyama
9,177,225 B1 *  11/2015  Cordova-Diba ...... G06T 7/0081
(Continued)

FOREIGN PATENT DOCUMENTS

WO    WO2015086537    6/2015

OTHER PUBLICATIONS

Kwatra, Vivek et al.; "Graphcut Textures: Image and Video Synthesis Using Graph Cuts"; found at http://www.cc.gatech.edu/cpl/projects/graphcuttextures; dated 2003; 10 pages.; GVU Center / College of Computing Georgia Institute of Technology.
(Continued)

*Primary Examiner* — Li Liu
(74) *Attorney, Agent, or Firm* — Patent Law Works LLP

(57) ABSTRACT

The disclosure includes a system and method for distinguishing objects of similar appearance that vary in color. An image recognition application receives a query image of a plurality of objects, determines a candidate list of indexed images that match an object in the query image based on luminance features, crops an image of the object from the query image to generate a cropped image, computes color features for the object, ranks the candidate list of indexed images based on the color features, and provides the candidate list of indexed images to a user.

20 Claims, 7 Drawing Sheets

(51) Int. Cl.
*G06T 7/40* (2017.01)
*G06T 5/40* (2006.01)
*G06K 9/46* (2006.01)
*H04N 9/797* (2006.01)

(52) U.S. Cl.
CPC ............... *G06T 5/40* (2013.01); *G06T 7/408* (2013.01); *H04N 9/7973* (2013.01); *G06T 2207/10024* (2013.01); *G06T 2207/20132* (2013.01)

(58) Field of Classification Search
CPC ...... G06K 9/3233; G06K 9/46; G06K 9/6215; G06F 17/30247; G06F 17/3025; G06F 17/30256
See application file for complete search history.

(56) References Cited

U.S. PATENT DOCUMENTS

| | | | |
|---|---|---|---|
| 2003/0083850 A1 | 5/2003 | Schmidt et al. | |
| 2006/0013463 A1 | 1/2006 | Ramsay et al. | |
| 2008/0089615 A1 | 4/2008 | Shiiyama | |
| 2008/0205756 A1* | 8/2008 | Kamata | G06K 9/6202 382/173 |
| 2008/0304753 A1* | 12/2008 | Sohma | G06F 17/30256 382/218 |
| 2009/0282025 A1* | 11/2009 | Winter | G06F 17/30256 |
| 2009/0316990 A1* | 12/2009 | Nakamura | G06K 9/4671 382/173 |
| 2012/0143856 A1* | 6/2012 | Klinkigt | G06K 9/4671 707/723 |
| 2012/0243737 A1 | 9/2012 | Ogawa | |
| 2012/0269429 A1* | 10/2012 | Lee | G06K 9/4652 382/165 |
| 2013/0202213 A1* | 8/2013 | Adamek | G06K 9/42 382/201 |
| 2014/0270350 A1* | 9/2014 | Rodriguez-Serrano | G06K 9/6217 382/103 |
| 2015/0049902 A1* | 2/2015 | Moraleda | G06K 9/00624 382/103 |
| 2015/0103199 A1* | 4/2015 | Pau | G06K 9/4647 348/222.1 |
| 2015/0205792 A1* | 7/2015 | Pau | G06F 17/3025 382/162 |
| 2016/0162758 A1* | 6/2016 | Prest | G06K 9/52 382/159 |
| 2017/0154204 A1* | 6/2017 | Ryu | G06K 9/00208 |

OTHER PUBLICATIONS

F. Pitie, et al.; "N-Dimensional Probability Density Function Transfer and its Application to Colour Transfer"; dated 2005; 6 pages; University of Dublin, trinity College Dublin 2, Ireland.
Matthew Brown and David G. Lowe "Automatic Panoramic Image Stitching Using Invariant Features"; dated Dec. 2006; 15 pages; International Journal of Computer Vision 74(1).
Francois Pitie, et al.; "Automated Colour Grading Using Colour Distribution Transfer"; dated 2007; 15 pages; Trinity College Dublin, 2 College Green, Dublin, Ireland.
F. Pitie, A. Kokaram "The Linear Monge-Kantorovitch Linear Colour Mapping for Example-Based Colour Transfer"; dated 2007; 9 pages; sigmedia.tv, Trinity College Dublin, Ireland.
Jorge Moraleda and Jonathan J. Hull; "Toward Massive Scalability in Image Matching"; dated 2010; 4 pages; 2010 International Conference on Pattern Recognition.
Mazin, Baptiste, et al. "Combining Color and Geometry for Local Image Matching" dated Nov. 11-15, 2012; 4 pages; 21st International Conference on Pattern Recognition (ICPR 2012), Tsukuba, Japan.
Nicolas Bonneel, et al. "Example-Based Video Color Grading" dated 2013; 11 pages.
Gormish, Michael; "Stitching Software for Ocutag Retail Execution (ORE)", dated Oct. 12, 2015; 15 pages.
Ramya Narasimha, et al. "Colour-Based Post-Processing of RVS Image Matching Results for ORE Product Disambiguation" dated Oct. 21, 2015, 18 pages.

* cited by examiner

COLOR-BASED POST-PROCESSING OF IMAGES

BACKGROUND

1. Field of the Invention

The specification generally relates to identifying and distinguishing between objects of similar appearance in a candidate list of indexed images based on color features. In particular, the specification relates to a system and method for re-ranking the candidate list of indexed images by transforming and comparing the indexed images and a query image of an object using a color transfer function.

2. Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks and display stands is a labor-intensive effort, thereby making enforcement of planograms difficult. While the location and quantity of products in retail stores can be manually tracked by a user, attempts are being made to automatically recognize the products using computers.

Previous attempts at recognizing products have deficiencies. For example, existing image recognition techniques fail to distinguish between objects that are similar in appearance but vary in color.

SUMMARY

The techniques introduced herein overcome the deficiencies and limitations of the prior art, at least in part, with a system and method for distinguishing objects of similar appearance that vary in color. In one embodiment, the system includes an image recognition application. The image recognition application is configured to receive a query image of objects and determine a candidate list of indexed images that match an object in the query image based on luminance features of the object. The image recognition application is further configured to crop an image of the object from the query image based on a region of interest associated with the object to generate a cropped image. The image recognition application is further configured to compute a color transfer function for an indexed image of the candidate list using sample colors from the cropped image of the object. The image recognition application is configured to apply the color transfer function to the indexed image and the cropped image. The image recognition application is further configured to rank the candidate list of indexed images based on the color features of the transformed indexed image and the transformed cropped image and provide the candidate list of indexed images to a user.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
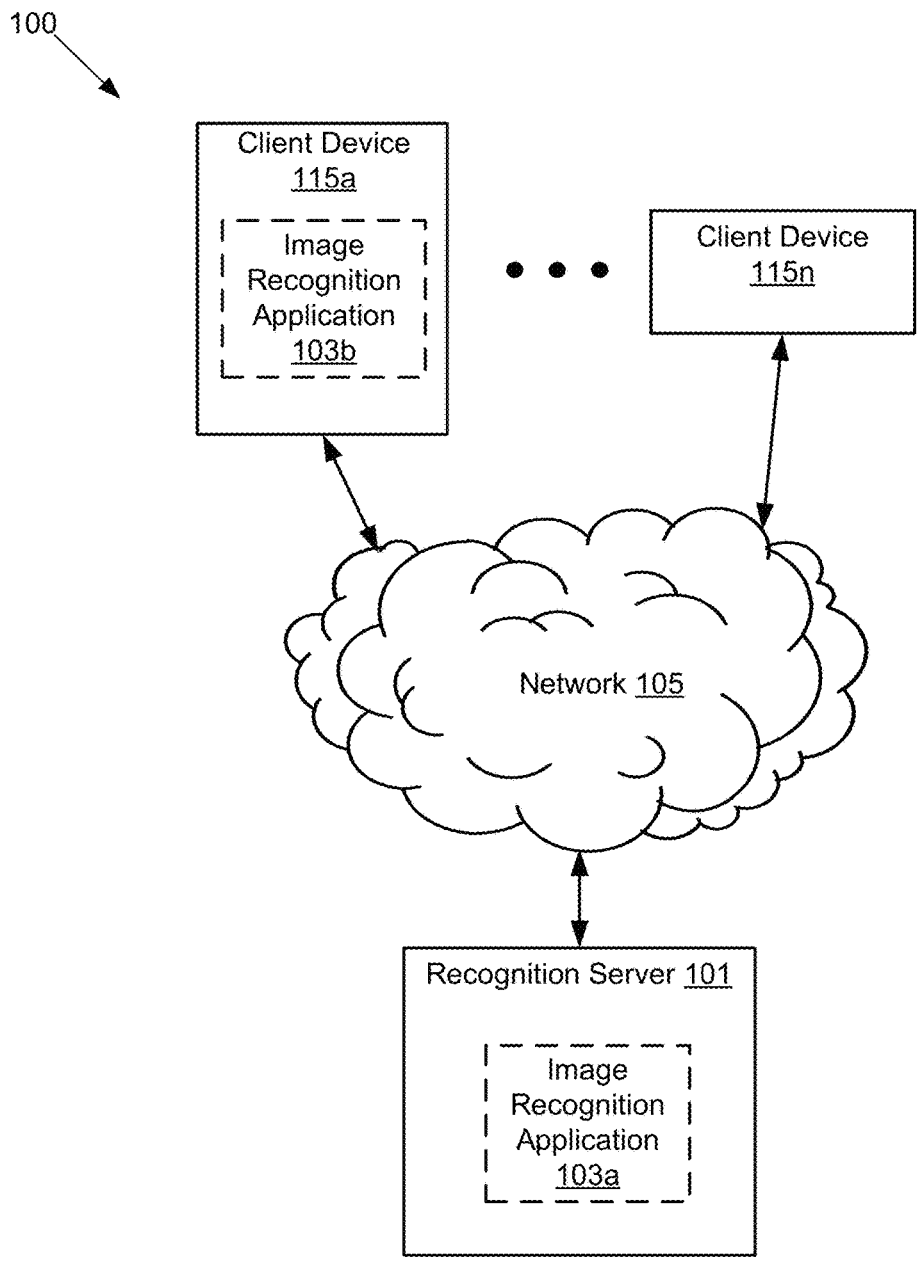
FIG. 1 is a high-level block diagram illustrating one embodiment of a system for distinguishing objects of similar appearance that vary in color.

FIG. 1 is a high-level block diagram illustrating one embodiment of a system 100 for distinguishing objects of similar appearance that vary in color. The illustrated system 100 may have client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to a consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images of objects to and from the client device 115. The images of objects received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster. The recognition server 101 also includes a data storage 243, which is described below in more detail with reference to FIG. 2.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for applications. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JSON (JavaScript Object Notation) format about one or more objects recognized in the query image to the client device 115.

The image recognition application 103 may include software and/or logic to provide the functionality for generating a candidate list of indexed images that match a cropped image of an object based on luminance features and filtering the candidate list of indexed images based on color features to disambiguate between objects of similar appearance that vary in color.

In some embodiments, the image recognition application 103b acts as a thin-client application with some functionality executed on the client device 115 and additional functionality executed on the recognition server 101 by image recognition application 103a. For example, the image recognition application 103b on the client device 115 could include software and/or logic for capturing the image, transmitting the image to the recognition server 101, and displaying image recognition results. A thin-client application 103b may include further functionality described herein with reference to image recognition application 103, such as processing the image and performing feature identification.

In some embodiments, the image recognition application 103 receives a query image depicting various objects. For example, the image may be of a shelf stocking breakfast cereal boxes in a retail supermarket. The image recognition application 103 identifies an object in the query image and determines a candidate list of indexed images that match the object based on luminance features of the object. For example, the image recognition application 103 identifies two indexed images in a candidate list. The first indexed image has 87% of luminance features matching the luminance features of the object. The second indexed image has 84% of luminance features matching the luminance features of the object. However, the candidate list based on luminance features may not suffice to distinguish objects of similar appearance that vary in color. The image recognition application 103 generates a region of interest for the object and crops the query image based on the region of interest for the object to generate a cropped image. The image recognition application 103 computes color features for the indexed images and the cropped image and re-ranks the candidate list of indexed images based on the color features. Continuing with the above example, the first and second indexed images in the candidate list may have been taken under a different illumination condition from that of the query image. The image recognition application computes color features for the two indexed images and the cropped image. The image recognition application 103 may swap the ranks of the first and second indexed images in the candidate list to disambiguate objects based on both luminance features and color features, e.g., the second indexed image instead of the first indexed image is the closest match to the cropped image. The operation of the image recognition application 103 and the functions listed above are described in more detail below with reference to FIGS. 3-5, 6A, and 6B.

Figure 2:
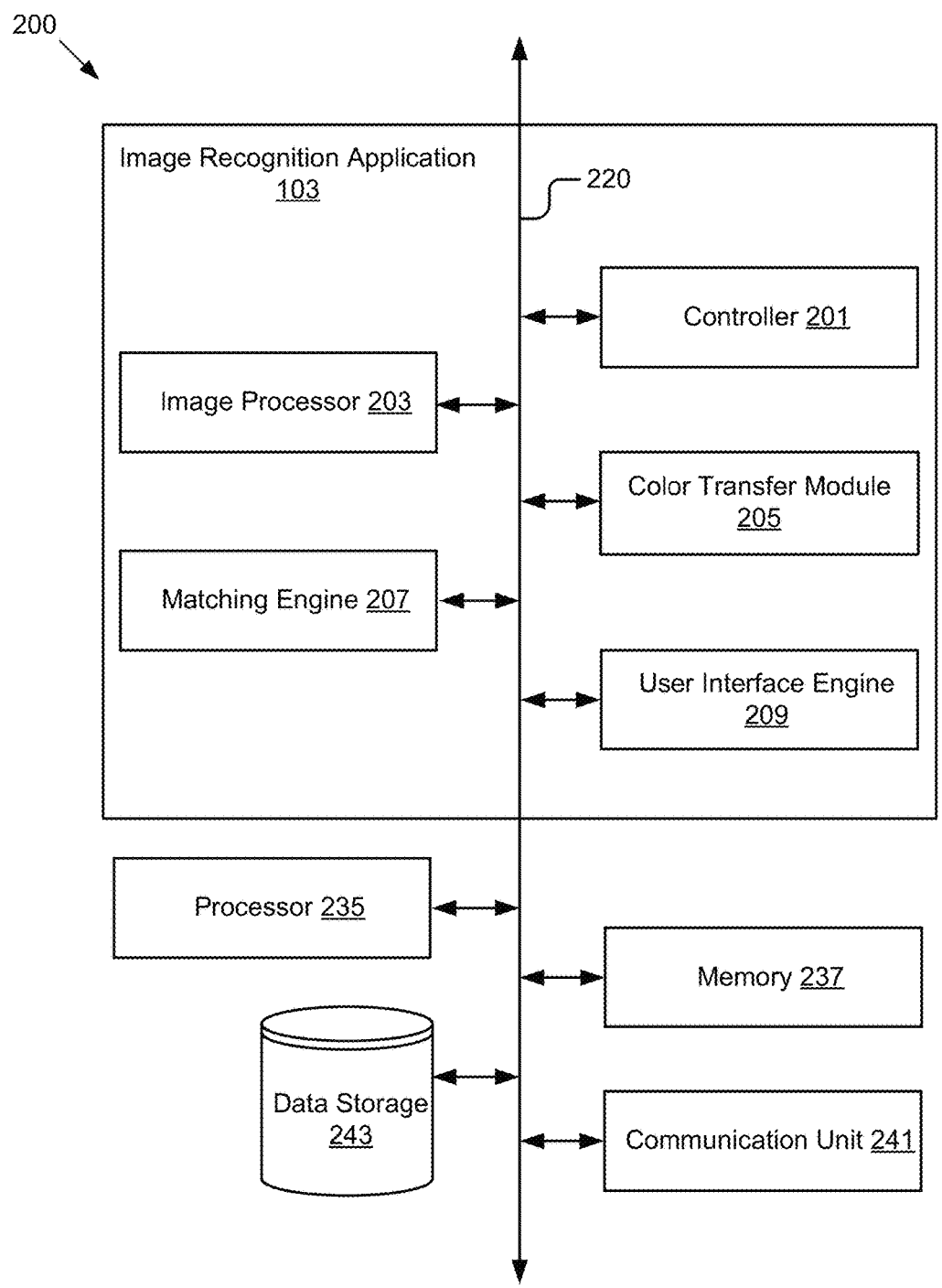
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, a communication unit 241, and data storage 243 according to some examples. The components of the computing device 200 are communicatively coupled by a bus or software communication mechanism 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be a client device 115, a recognition server 101, or a combination of a client device 115 and a recognition server 101.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the image recognition application 103, and the data storage 243. It will be apparent that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 37 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a dynamic random access memory (DRAM) device, a static random access memory (SRAM) device, an embedded memory device, a discrete memory device a PROM, FPROM, ROM), a hard disk drive, optical disk drive (CD, DVD, Blu-ray™, etc.) mediums, which can be any tangible apparatus or device that can contains, stores, communicates, or transports instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The communication unit 241 is hardware and/or software for receiving and transmitting data by linking the processor 235 to the network 105 and other processing systems. The communication unit 241 receives data such as requests from the client device 115 and transmits the requests to the controller 201, for example a request to process an image depicting various objects. The communication unit 241 also transmits information including recognition results to the client device 115 for display, for example, in response to a query image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store query images depicting various objects received from the client device 115, cropped images of an object obtained from a query image, and indexed images of the object that match the object obtained from the query image. The data storage 243 may also store object attributes and object features. For example, for a product sitting on a shelf of a retail store, the product attributes may include product name, product identifier, shelf identifier, width, height, depth, area, diagonal length, color, packaging, product description, product size, manufacturer brand, model number, price, material, or the like. The product features may include luminance features of the product, color features of the product, a location of a feature in a query image, regions of interest for the product, and the pixel dimensions of the regions of interest. The data storage 243 may also store the color transfer function as described herein. The data stored in the data storage 243 is described below in more detail.

In some embodiments, the image recognition application 103 may include a controller 201, an image processor 203, a color transfer module 205, a matching engine 207 and a user interface engine 209. The components of the image recognition application 103 are communicatively coupled via the bus or software communication mechanism 220. The modules of the image recognition application can be implemented using programmable or specialized hardware including a field-programmable gate array (FPGA) or an application-specific integrated circuit (ASIC). In some embodiments, the modules of the image recognition application can be implemented using a combination of hardware and software executable by processor 235. In some embodiments, the modules of the image recognition application are sets of instructions executable by the processor 235. In some implementations, the modules of the image recognition application are stored in the memory 237 and are accessible and executable by the processor 235. In some implementations, the modules of the image recognition application are adapted for cooperation and communication with the processor 235, the memory 237 and other components of the image recognition application 103 via the bus or software communication mechanism 220.

The controller 201 may include software and/or logic to control the operation of the other components of the image recognition application 103. The controller 201 controls the other components of the image recognition application 103 to perform the methods described below with reference to FIGS. 5, 6A and 6B. The controller 201 may also include software and/or logic to provide the functionality for handling communications between the image recognition application 103 and other components of the computing device 200 as well as between the components of the image recognition application 103. In some implementations, the processor 235, the memory 237 and other components of the image recognition application 103 can cooperate and communicate without the controller 201.

In some embodiments, the controller 201 sends and receives data, via the communication unit 241, to and from one or more of a client device 115 and a recognition server 101. For example, the controller 201 receives, via the communication unit 241, an image from a client device 115 operated by a user and sends the image to the image processor 203. In another example, the controller 201 receives data for providing a graphical user interface to a user from the user interface engine 209 and sends the data to a client device 115, causing the client device 115 to present the user interface to the user.

In some embodiments, the controller 201 receives data from other components of the image recognition application 103 and stores the data in the data storage 243. For example, the controller 201 receives data including a color transfer function from the color transfer module 205 and stores the data in the data storage 243. In other embodiments, the controller 201 retrieves data from the data storage 243 and sends the data to other components of the image recognition application 103. For example, the controller 201 retrieves data including indexed images from the data storage 243 and sends the retrieved data to the matching engine 207.

The image processor 203 may include software and/or logic to provide the functionality for receiving and processing a query image with a plurality of objects based on luminance features of objects. In some embodiments, the image processor 203 receives a query image depicting various objects for recognition. For example, the query image may include multiple products on a shelf in a retail store. The query image can be an image of packaged products, such as rectangular breakfast cereal boxes, circular soda bottles, etc. captured by the client device 115 at a distance from the shelving unit. The packaged product may include textual and pictorial information printed on its surface that distinguishes it from other items on the shelf.

The image processor 203 extracts features (e.g., luminance features) from the query image and matches the extracted features to those features stored in the database for recognition. The image processor 203 identifies the objects in the query image matching the stored features. In some embodiments, the image processor 203 identifies objects from a query image based on luminance features of the objects. For example, the image processor 203 receives a color query image of a plurality of objects, separates pixel values of the query image into luminance and chrominance components, extracts luminance features based on the luminance components, and identifies the objects in the query image based on the luminance features based on matching luminance features in the database of stored features. The image processor 203 transmits the chrominance components of the query image to the color transfer module 205 for further processing identification results based on color features as described below.

In some embodiments, the image processor 203 determines an associated region of interest (ROI) for each of the matched objects in the query image. In some embodiments, the image processor 203 also determines a ROI for each indexed image of the object stored in the data storage 243. In other embodiments, the image processor 203 may process the indexed image without determining a ROI. In this case, the entire indexed image is a ROI. A region of interest can be of any shape, for example, a circle with a center point and a diameter, a rectangular shape of a width, a height and one or more reference points for the region (e.g., a center point, one or more corner points for the region), etc. In some embodiments, the image processor 203 determines a ROI for an object in the query image based on locations of luminance features.

The image processor 203 crops an image of the object from the query image to generate a cropped image. In some embodiments, the image processor 203 crops non-informative background regions from the query image to generate a cropped image that contains only the object. In other embodiments, the image processor 203 generates the cropped image of the object by cropping the query image based on the ROI determined for the object in the query image. For example, the image processor 203 determines a background of the query image that is unwanted based on the ROI determined for the object and crops the background of the query image to accentuate the ROI (e.g., the packaged product).

In some embodiments, the image processor 203 may match luminance features of an object in the query image to luminance features associated with indexed images of objects stored in the data storage 243, rank the indexed images based on the luminance features, and generate a candidate list of indexed images based on the ranking. For example, the image processor 203 ranks the plurality of indexed images based on the percentage of the luminance features of the cropped image that match the luminance features of the plurality of indexed images, and includes the top ranked indexed images in the candidate list. The indexed images in the candidate list are similar to the object in the query image in luminance features.

Figure 3:
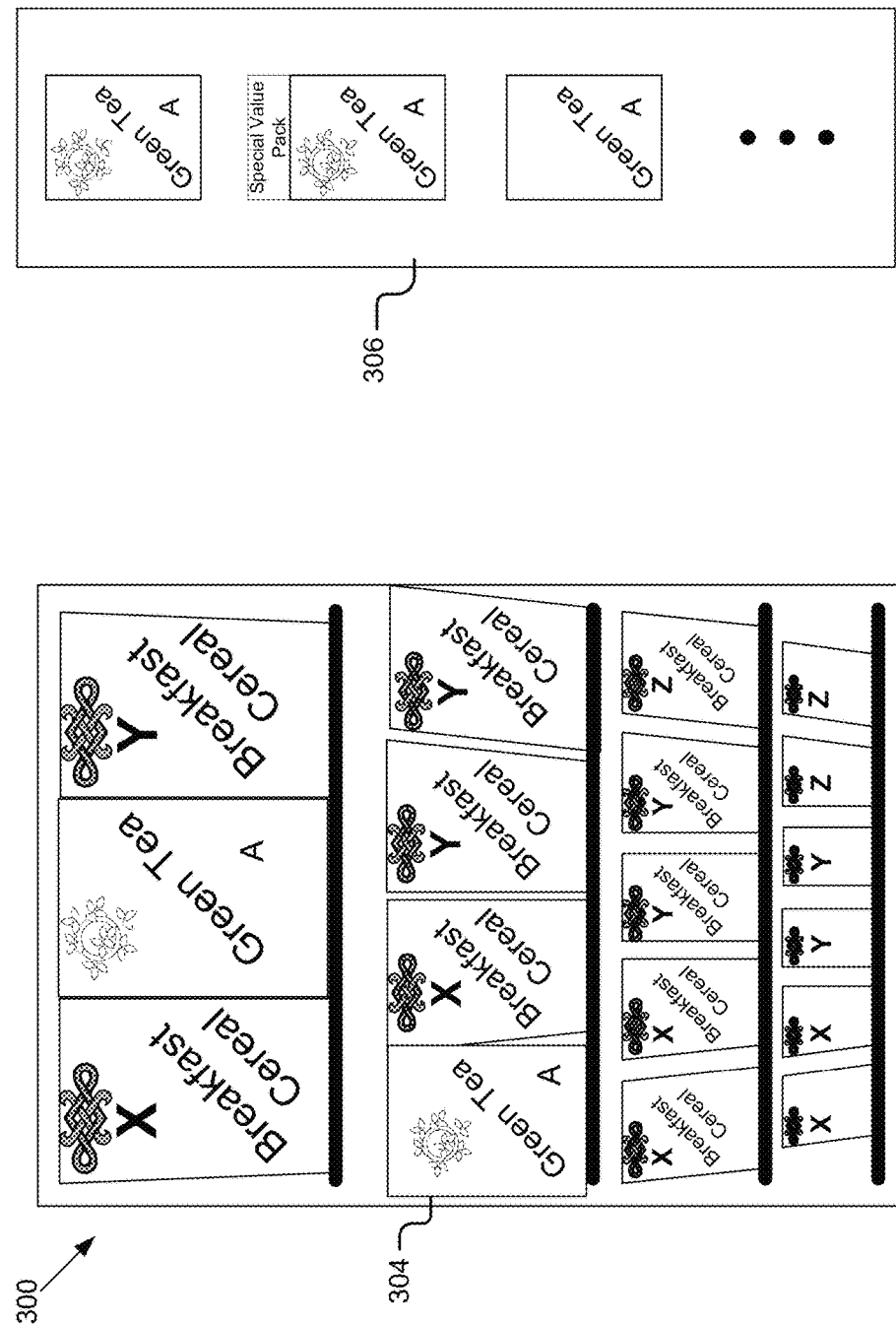
FIG. 3 is a graphical representation of one embodiment of determining a candidate list of indexed images that match a cropped image of an object.

FIG. 3 is a graphical representation 300 of one embodiment of determining a candidate list of indexed images that match an object in a query image. Image 302 is a query image of packaged products on shelves in a retail store. The image processor 203 extracts luminance features from the query image 302 and identifies, for example, a green tea box 304 based on luminance features.

The image processor 203 generates a candidate list 306 that includes multiple indexed images that match the identified green tea box 304. In the example of FIG. 3, the candidate list 306 includes the top three ranked images (although the candidate list may include any number of candidate indexed images), for example, the first indexed image of which 93% luminance features match the luminance features of the identified green tea box 304, the second indexed image of which 85% luminance features match the luminance features of the identified green tea box 304, and the third indexed image of which 80% luminance features match the luminance features of the identified green tea box 304. In some embodiments, the ranking of the indexed images in the candidate list may be based on a ratio of the area surrounding the luminance features to the area of the ROI for the identified object. However, without a comparison of other features (e.g., color features), the matches in the candidate list based on the luminance features may or may not be a true match of the identified green tea box 304.

In some embodiments, the image processor 203 identifies an indexed image in the candidate list based on locations of luminance features that the indexed image have in common with the identified object in the query image. For example, in FIG. 3, the image processor 203 may identify the first indexed image of the candidate list 306 that borders the exposed labeling containing pictorial and textual information of the green tea box 304. The image processor 203 may also identify the third indexed image of the candidate list 306 that borders only textual information of the green tea box 304. In some embodiments, the image processor 203 may also generate different cropped images from the query images based on the ROI generated from matching luminance features corresponding to the matching indexed images as shown below with reference to FIG. 4.

In some embodiments, the image processor 203 transmits the cropped images and ROIs to the color transfer module 205. In other embodiments, the image processor 203 also stores the identified cropped images and ROIs in the data storage 243. The color transfer module 205 may include software and/or logic to provide the functionality for determining a color transfer function based on a cropped image of an object and an indexed image of the object in a candidate list. To distinguish between objects in the indexed images of the candidate list that vary in color, the color transfer module 205 takes into account the color features of the object and re-ranks the candidate list of indexed images based on the color features.

In some embodiments, the color transfer module 205 receives a cropped image of an object from a query image, a candidate list of indexed images that match the cropped image, and associated ROIs for the cropped image. The color transfer module computes a color transfer function for an indexed image of the candidate list using sample colors collected from the ROI of the object in the cropped image and the indexed image. For example, the color transfer module 205 may use the cieLAB color space to compute a linear color transfer function. The color transfer module 205 determines a color transfer function using a small subset of color samples collected from the cropped image and the index image, and applies the color transfer function to the rest of the pixels in the cropped image and the indexed image. For example, the color transfer module 205 uses locations of luminance features within ROIs of the cropped image and the indexed image to sample the colors. In some embodiments, the color transfer module 205 collects color samples from the indexed image I of the candidate list and computes the mean $\mu_I$ and the covariance $\Sigma_I$. The color transfer module 205 also collects color samples from the cropped image R and computes the mean $\mu_R$ and the covariance $\Sigma_R$. The color transfer module 205 computes the color transfer function T using the following equation:

$$T=\Sigma_I^{-1/2}(\Sigma_I^{1/2}\Sigma_R\Sigma_I^{1/2})\Sigma_I^{1/2}$$

The color transfer module 205 applies the color transfer function T to all pixels of the indexed image I to obtain a transformed indexed image $I_{tr}$, which is:

$$I_{tr}=T(I-\mu_I)+\mu_R$$

Similarly, the color transfer module 205 applies the inverse color transfer function $T^{-1}$ to all pixels of the cropped image R to obtain a transformed cropped image $R_{tr}$, which is:

$$R_{tr}=T^{-1}(R-\mu_R)+\mu_I$$

By application of the color transfer function T or $T^{-1}$, the color of the transformed cropped image $R_{tr}$ becomes similar to the color of the indexed image I while the color of the transformed indexed image $I_{tr}$ becomes similar to the color of the cropped image R. The matching engine 207 may then determine a distance measuring color closeness to position or re-rank the indexed image in the candidate list.

The matching engine 207 may include software and/or logic to provide the functionality for ranking the candidate list of indexed images based on comparing the transformed images with the original images. The matching engine 207 computes a distance measure between the transformed images and the original images (e.g., between the transformed indexed image and the original cropped image and between the original indexed image and the transformed cropped image) and computes a score based on the distance measures. The matching engine 207 may then position the indexed image in the candidate list based on the score.

The matching engine 207 computes a distance measure between the cropped image and the transformed indexed image and a distance measure between the indexed image and the transformed cropped image. In some embodiments, the distance measures are an earth mover's distance (EMD). The EMD measures the distance between two probability distributions over a region. The matching engine 207 may compute a score using the EMDs as shown in the equation below and uses the score to position the indexed image in the candidate list.

$$\text{Score}=\text{EMD}(I_{tr},R)+\text{EMD}(R_{tr},I)$$

The score is a sum of the first and second EMDs. The smaller the score (e.g., the smaller the EMDs), the better the match is between the cropped image and the indexed image. In some embodiments, the score is used as a rank to determine a position of the indexed image in the candidate list. For example, the matching engine 207 may compute a score for indexed images in a candidate list received from the color transfer module 205 and rank the indexed images in the candidate list based on the scores. In some embodiments, the color transfer module 205 and the matching engine 207 may score and position all or a portion of the indexed images in the candidate list. The addition of color features to the luminance features used in ranking candidate indexed images increases the accuracy of image recognition.

In other embodiments, the distance measures may be Pearson correlation coefficients. The matching engine 207 computes a Pearson correlation coefficient between the cropped image and the transformed indexed image and between the indexed image and the transformed cropped image. The matching engine 207 uses the Pearson correlation coefficient as a measure of the degree of linear dependence between two images. The closer to zero the Pearson correlation coefficients, the less appreciable the match between the cropped image and the indexed image is. The matching engine 207 may determine a score for the indexed image based on the Pearson correlation coefficients and uses the score to position the indexed image in the candidate list.

In some embodiments, the matching engine 207 filters the indexed images in the candidate list based on the scores associated with the indexed images. In some embodiments, the matching engine 207 determines whether a score associated with an indexed image satisfies a predetermined score threshold and removes the indexed image from the candidate list responsive to the score associated with the indexed image failing to satisfy the threshold. For example, the matching engine 207 removes any indexed image with a score less than the score threshold 70 from the candidate list.

In some embodiments, the matching engine 207 filters the candidate list and ranks the filtered candidate list. In other embodiments, the matching engine 207 ranks the candidate list and filters the candidate list by removing the bottom K-ranked indexed images having scores failing to satisfy the threshold.

In some embodiments, the matching engine 207 instructs the user interface engine 209 to generate graphical data for providing the candidate list to a user. In other embodiments, the matching engine 207 also stores the candidates list and the scores associated with each indexed image of the candidate list on the data storage 243.

Figure 4:
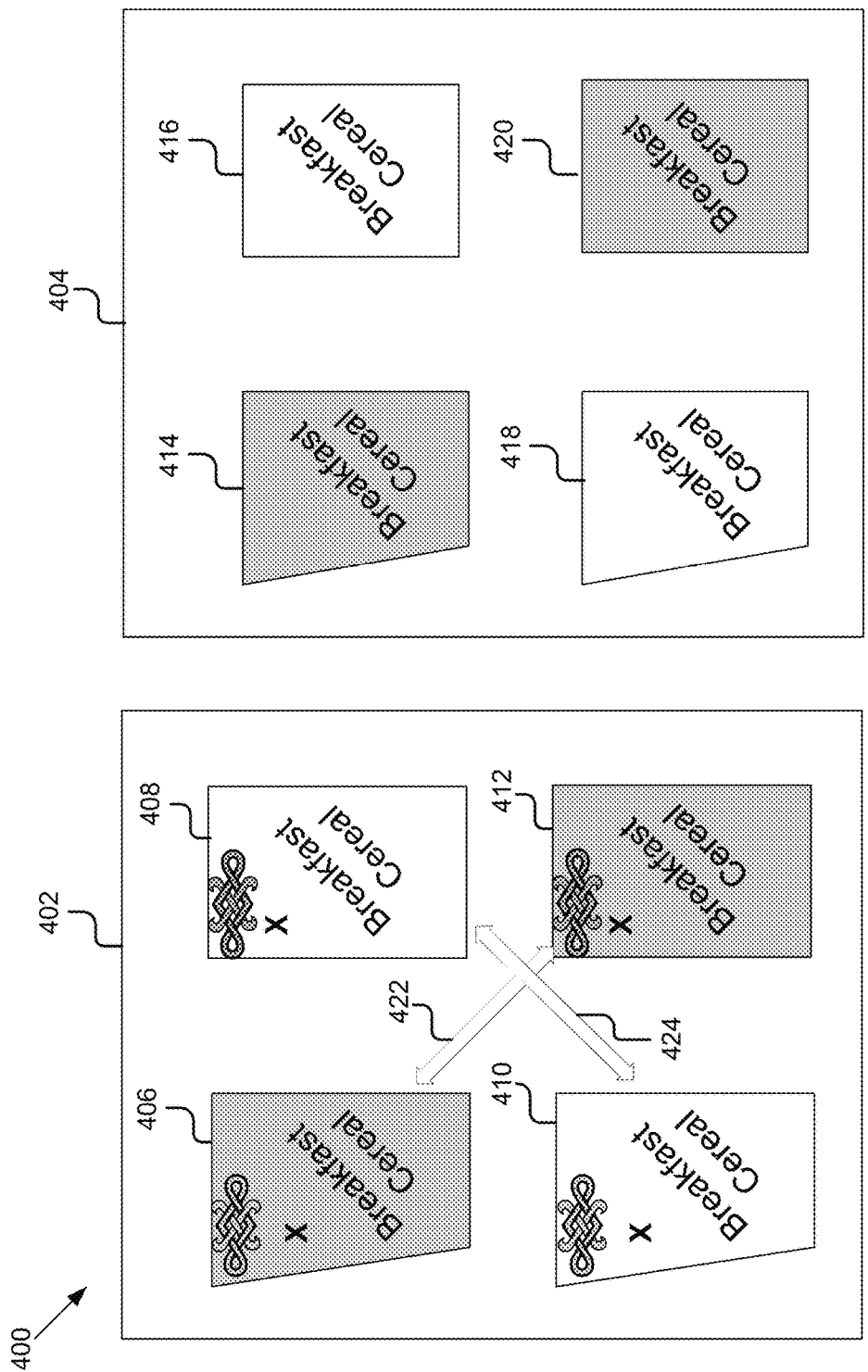
FIG. 4 is a graphical representation of one embodiment of transforming a cropped image of an object and an indexed image corresponding to the cropped image of the object using a color transfer function.

FIG. 4 is a graphical representation 400 of one embodiment of transforming a cropped image of an object and an indexed image corresponding to the cropped image of the object using a color transfer function. In one example 402, FIG. 4 depicts a cropped image 406 that includes a breakfast cereal box and an indexed image 408 that matches the cropped image 406 based on the luminance features. In the example of FIG. 4, the cropped image 406 may be taken in a dark area and the indexed image may be taken in better light conditions. The difference of illumination conditions is depicted by the grey color of the cropped image 406 and the white color of the indexed image 408.

The color transfer module 205 determines a color transfer function based on the color samples collected from the cropped image 406 and the indexed image 408. The color transfer module 205 transforms the cropped image 406 to the transformed cropped image 410 using the color transfer function. Similarly, the color transfer module 205 transforms the indexed image 408 to the transformed indexed image 412 using the color transfer function. As is depicted in the example of FIG. 4, the transformed indexed image 412 is darker than the original indexed image 408, which is closer to the color of the cropped image 406. Similarly, the transformed cropped image 410 is brighter than the original cropped image 406, which is closer to the color of the indexed image 408.

The matching engine 207 computes a distance measure (e.g., an EMD or Pearson correlation coefficient) 422 between the cropped image 406 and the transformed indexed image 412. The matching engine 207 also computes a distance measure 424 between the indexed image 408 and the transformed cropped image 410. The matching engine 207 determines a first score based on the distance measures and positions the indexed image 408 in the candidate list based on the score.

In another example 404, FIG. 4 depicts a cropped image 414 and an indexed image 416. As depicted in the example of FIG. 4, the cropped image 414 is a different crop (e.g., based on a different ROI corresponding to different matching luminance features) of the same breakfast cereal box from a query image. The indexed image 416 is a different indexed image than indexed image 408 based on matching different luminance features in the query image. The indexed image 416 and indexed image 408 may be different indexed images in a candidate list as described above. The color transfer module 205 transforms the cropped image 414 to a transformed cropped image 418 and transforms the indexed image 416 to a transformed indexed image 420. Similarly, the matching engine 207 computes a score for the indexed image 416 using images 414-420. The matching engine 207 positions the indexed images 408 and 416 in the candidate list based on their respective scores, for example, placing the indexed image 408 on top of the indexed image 416 in the candidate list because indexed image 408 has a better score (e.g., the distance measure is lower).

The user interface engine 209 may include software and/or logic for providing user interfaces to a user. In some embodiments, the user interface engine 209 receives instructions from the image processor 203 to generate a graphical user interface that instructs the user to capture an image of a retail shelf stocking products. In some embodiments, the user interface engine 209 receives information from the image processor 203 to generate an outline to identify the region of interest associated with an identified product. The user interface engine 209 may further display the candidate list and other information described herein to a user. In other embodiments, the user interface engine 209 sends the graphical user interface data to an application (e.g., a browser) in the client device 115 via the communication unit 241 causing the application to display the data (e.g., a candidate list of indexed images matching the identified product) in a user interface.

Figure 5:
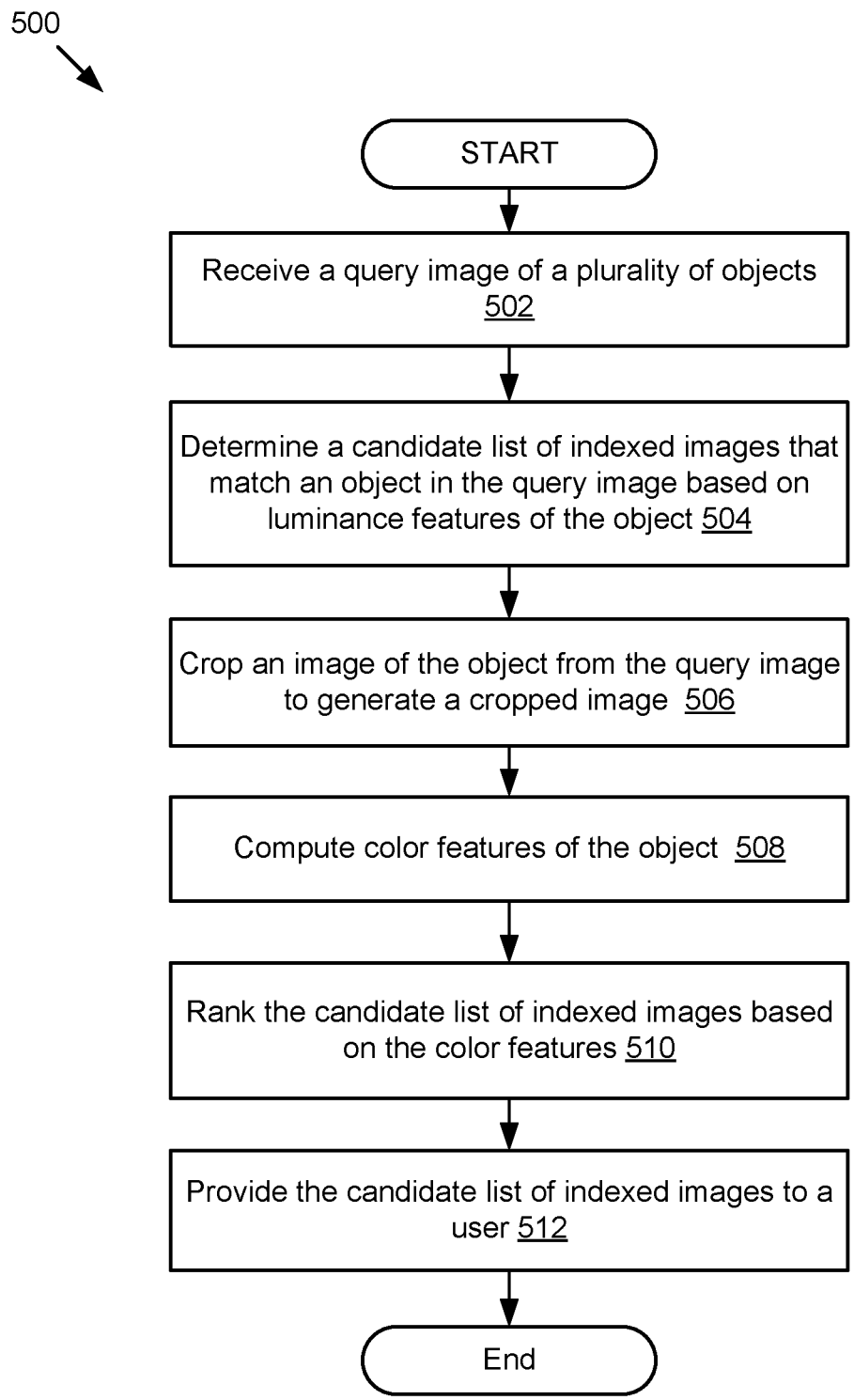
FIG. 5 is a flow diagram illustrating one embodiment of a method for distinguishing objects of similar appearance that vary in color.

FIG. 5 is a flow diagram 500 illustrating one embodiment of a method for distinguishing objects of similar appearance that vary in color. As described above, the image recognition application 103 may include an image processor 203, a color transfer module 205, a matching engine 207 and a user interface engine 209. At 502, the image processor 203 receives a query image of a plurality of objects. At 504, the image processor 203 determines a candidate list of indexed images that match an object in the query image based on luminance features of the object. At 506, the image processor 203 crops an image of an object from the query image to generate a cropped image. At 508, the color transfer module 205 computes color features of the object. At 510, the matching module 207 ranks the candidate list of indexed images based on the color features. At 512, the matching module 207 instructs the user interface engine 209 to provide the candidate list of indexed images to a user.

Figure 6A:
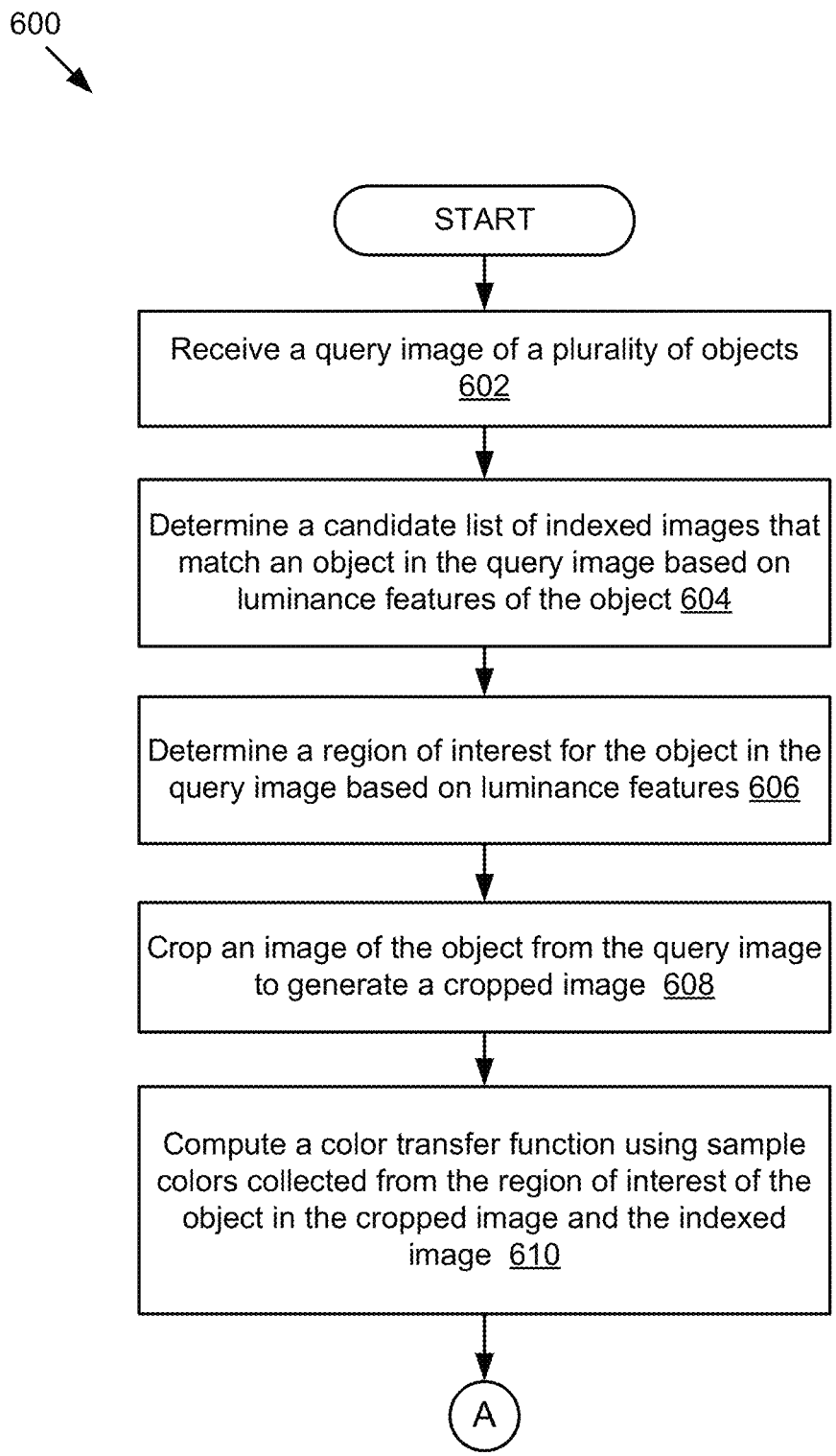
FIGS. 6A and 6B are a flow diagram illustrating another embodiment of a method for distinguishing objects of similar appearance that vary in color.
Figure 6B:
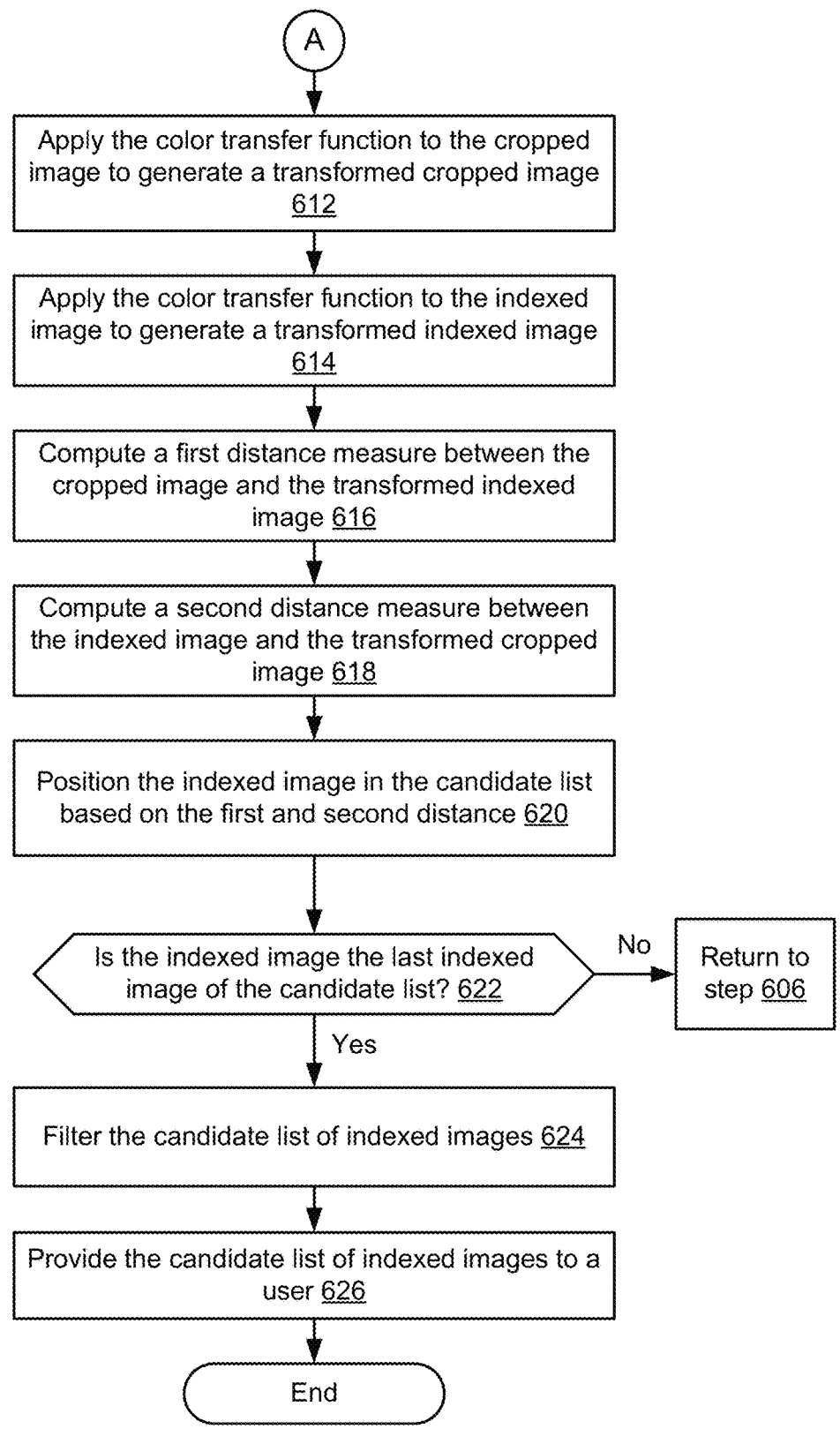

FIGS. 6A and 6B are a flow diagram 600 illustrating another embodiment of a method for distinguishing objects of similar appearance that vary in color. As described above, the image recognition application 103 may include an image processor 203, a color transfer module 205, a matching engine 207 and a user interface engine 209. In FIG. 6A, at 602, the image processor 203 receives a query image of a plurality of objects. For example, the query image may include multiple products on a shelf in a retail store. At 604, the image processor 203 determines a candidate list of indexed images that match an object in the query image based on the luminance features of the object. For example, the image processor 203 ranks the indexed images based on the percentage of the luminance features of the cropped image that match the luminance features of the plurality of indexed images. At 606, the image processor 203 determines a region of interest for an object in the query image based on luminance features. For example, the region of interest may be determined by luminance features that match luminance features of an indexed image. At 608, the image processor 203 crops an image of the object from the query image to generate a cropped image. In some embodiments, the image processor 203 crops non-informative background regions from the query image to generate a cropped image that contains only the object. In other embodiments, the image processor 203 generates the cropped image of the object by cropping the query image based on the region of interest determined for the object in the query image.

At 610, the color transfer module 205 computes a color transfer function using sample colors collected from the region of interest of the object in the cropped image and the indexed image. The calculation of the color transfer function is described in more detail above.

Referring now to FIG. 6B, at 612, the color transfer module 205 applies the color transfer function to the cropped image to generate a transformed cropped image. At 614, the color transfer module 205 applies the color transfer function to the indexed image to generate a transformed indexed image. At 616, the matching module 207 computes a first distance measure between the cropped image and the transformed indexed image. At 618, the matching module 207 computes a second distance between the indexed image and the transformed cropped image. In some embodiments, the first distance measure and the second distance measure are an earth mover's distance (EMD). In other embodiments, the first distance measure and the second distance measure are Pearson correlation coefficients. At 620, the matching module 207 positions the indexed image in the candidate list based on the first and second distance measures. For example, the matching module 207 computes a score for the indexed image based on the first and second distances, and positions the indexed image based on the score.

At 622, the matching module 207 determines whether the indexed image is the last indexed image of the candidate list. If the indexed image is not the last indexed image of the candidate list, the method 600 returns to step 606. In some embodiments, the matching module 207 may generate a score for fewer than the total number of indexed images in the candidate list. For example, if a threshold value of similarity (e.g., a percentage of matching luminance features, a ratio of the area of luminance features to the region of interest, etc.) is not satisfied, the matching module 207 may continue to 624. If the indexed image is the last indexed image of the candidate list, the matching module 207 filters 624 the candidate list of indexed images. For example, the matching engine 207 determines whether a score associated with an indexed image satisfies a predetermined score threshold and removes the indexed image from the candidate list responsive to the score associated with the indexed image failing to satisfy the threshold. At 626, the matching module 207 instructs the user interface engine 209 to provide the candidate list of indexed images to a user.

A system and method for identifying and distinguishing between products of similar appearance that vary in color has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to, firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, by one or more processors, a query image of a plurality of objects;
   determining, by the one or more processors, a candidate list of indexed images that match an object in the query image based on luminance features;
   cropping, by one or more processors, an image of the object from the query image to generate a cropped image;
   computing, by the one or more processors, a color transfer function using sample colors collected from the cropped image and an indexed image of the candidate list;
   ranking, by the one or more processors, the candidate list of indexed images based on one or more distance measures computed using the color transfer function; and
   providing, by the one or more processors, the ranked candidate list of indexed images to a user.

2. The method of claim 1, further comprising:
   determining, by the one or more processors, a region of interest for the object in the query image based on the luminance features; and
   determining, by the one or more processors, a region of interest for the indexed image based on the luminance features.

3. The method of claim 2, wherein computing the color transfer function further comprises collecting the sample colors from the region of interest determined for the cropped image and the region of interest determined for the indexed image.

4. The method of claim 3, wherein computing the color transfer function further comprises:
   applying, by the one or more processors, the color transfer function to the cropped image to generate a transformed cropped image;
   applying, by the one or more processors, the color transfer function to the indexed image to generate a transformed indexed image;
   computing, by the one or more processors, a first distance measure between the cropped image and the transformed indexed image; and
   computing, by the one or more processors, a second distance measure between the indexed image and the transformed cropped image.

5. The method of claim 4, wherein ranking the candidate list of indexed images is based on the first distance measure and the second distance measure.

6. The method of claim 4, wherein the first distance and the second distance are an earth mover's distance.

7. The method of claim 1, further comprising filtering the candidate list of indexed images based on the ranking.

8. A system comprising;
   one or more processors; and
   a memory, the memory storing instructions, which when executed cause the one or more processor to:
   receive a query image of a plurality of objects;
   determine a candidate list of indexed images that match an object in the query image based on luminance features;
   crop an image of the object from the query image to generate a cropped image;
   compute a color transfer function using sample colors collected from the cropped image and an indexed image of the candidate list;
   rank the candidate list of indexed images based on one or more distance measures computed using the color transfer function; and
   provide the ranked candidate list of indexed images to a user.

9. The system of claim 8, wherein the instructions further cause the one or more processors to:
   determine a region of interest for the object in the query image based on the luminance features; and
   determine a region of interest for the indexed image based on the luminance features.

10. The system of claim 9, wherein to compute the color transfer function, the instructions cause the one or more processors to collect the sample colors from the region of interest determined for the cropped image and the region of interest determined for the indexed image.

11. The system of claim 10, wherein to compute the color transfer function, the instructions cause the one or more processors to:
- apply the color transfer function to the cropped image to generate a transformed cropped image;
- apply the color transfer function to the indexed image to generate a transformed indexed image;
- compute a first distance measure between the cropped image and the transformed indexed image; and
- compute a second distance measure between the indexed image and the transformed cropped image.

12. The system of claim 11, wherein the instructions cause the one or more processors to rank the candidate list of indexed images based on the first distance measure and the second distance measure.

13. The system of claim 11, wherein the first distance measure and the second distance measure are a Pearson correlation coefficient.

14. The system of claim 8, wherein the instructions further cause the one or more processors to filter the candidate list of indexed images based on the ranking.

15. A computer program product comprising a non-transitory computer readable medium storing a computer readable program, wherein the computer readable program when executed causes a computer to perform operations comprising:
- receiving a query image of a plurality of objects;
- determining a candidate list of indexed images that match an object in the query image based on luminance features;
- cropping an image of the object from the query image to generate a cropped image;
- computing a color transfer function using sample colors collected from the cropped image and an indexed image of the candidate list;
- ranking the candidate list of indexed images based on one or more distance measures computed using the color transfer function; and
- providing the ranked candidate list of indexed images to a user.

16. The computer program product of claim 15, wherein the computer readable program further causes the computer to:
- determine a region of interest for the object in the query image based on the luminance features; and
- determine a region of interest for the indexed image based on the luminance features.

17. The computer program product of claim 16, wherein computing the color transfer function further comprises collecting the sample colors from the region of interest determined for the cropped image and the region of interest determined for the indexed image.

18. The computer program product of claim 17, wherein computing the color transfer function further comprises:
- applying the color transfer function to the cropped image to generate a transformed cropped image;
- applying the color transfer function to the indexed image to generate a transformed indexed image;
- computing a first distance measure between the cropped image and the transformed indexed image; and
- computing a second distance measure between the indexed image and the transformed cropped image.

19. The computer program product of claim 18, wherein ranking the candidate list of indexed images is based on the first distance measure and the second distance measure.

20. The computer program product of claim 15, wherein the computer readable program further causes the computer to filter the candidate list of indexed images based on the ranking.

* * * * *